2,830,614

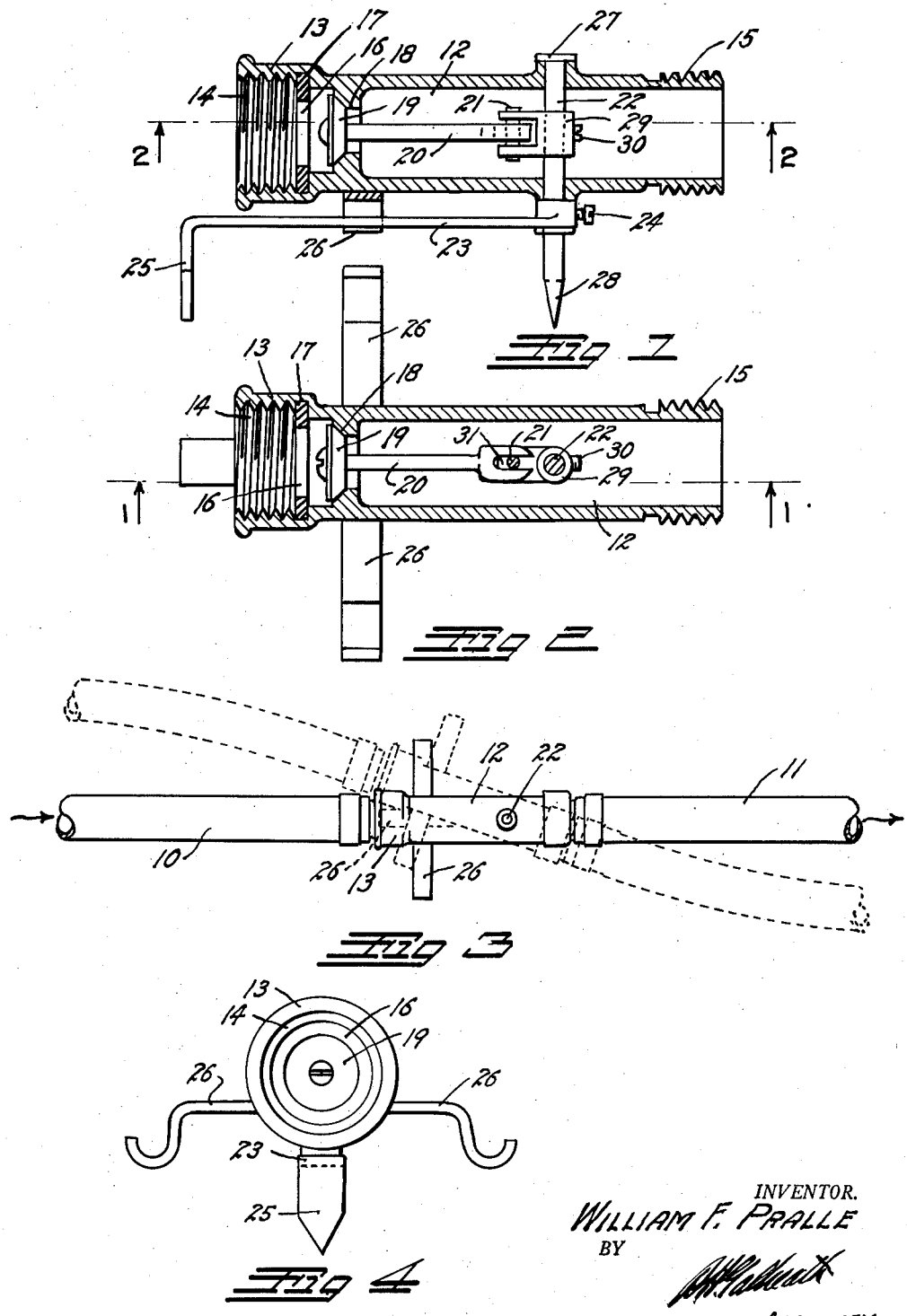

HOSE VALVES

William F. Praile, Burlington, Colo., assignor of one-third to J. Ted Clark, doing business as Clark-Feather Manufacturing Company, Fort Morgan, and one-third to H. J. Rau, Burlington, Colo.

Application January 26, 1956, Serial No. 561,486

4 Claims. (Cl. 137—356)

This invention relates to a hose valve more particularly for controlling the flow through lawn sprinkling hoses.

The principal of the invention is to provide a valve which can be operated by a simple sideward movement of the hose to shut the water off from a lawn sprinkler so that the latter may be approached without wetting the user and without it being necessary to shut off the water at the main hose valve.

While more particularly designed for attachment to a set sprinkling nozzle it will be equally useful positioned between lengths of hose and between a hose and the main supply valve.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a vertical, longitudinal section through the improved hose valve, taken on the line 1—1, Fig. 2;

Fig. 2 is a similar horizontal, longitudinal section, taken on the line 2—2, Fig. 1;

Fig. 3 is a reduced top view of the improved hose valve illustrating the latter connected between two lengths of hose; and Fig. 4 is an end view of the valve of Figs. 1 and 2 looking toward the intake end of the valve.

In Fig. 3 a water supply hose is indicated at 10 and a water receiving hose at 11. A conventional lawn sprinkler of the set variety may be positioned in place of the water receiving hose 11 if desired.

The improved hose valve is contained in an elongated tubular valve housing 12 provided at its intake extremity with a coupling bell 13 provided with internal hose threads 14 and provided with external hose threads 15 at its discharge extremity.

A resilient hose washer 16 is seated in an annular washer groove 17 in the base of the bell 13 and an annular valve seat 18 is formed in the housing 12 in spaced relation to the washer 16.

A valve disc 19 is positioned between the washer 16 and the valve seat 18. The diameter of the valve disc 19 exceeds the diameter of the opening in the washer so that the former is retained in the housing by the latter. The diameter of the valve disc 19 also exceeds the internal diameter of the valve seat 18 so that the valve disc will close the seat under the pressure of incoming water.

A valve stem 20 extends axially from the valve disc 19 into the housing 12 and into the path of a crank member 21 formed or mounted on a crank rod 22. The crank rod 22 extends vertically and diametrically through the housing 12 and projects downwardly from the latter.

A rod locking lever 23 is secured to the downwardly projecting portion of the rod 22 in any desired manner such as by means of a suitable set screw 24. The locking lever extends rearwardly beneath the housing 12 and terminates below the intake bell 13 in a downwardly extending ground-engaging point 25.

A transversely extending foot member 26 is mounted beneath the housing 12 and extends outwardly and downwardly from each side thereof. The foot member serves a double purpose first it acts to maintain the housing in a horizontal position and second it acts as a limiting stop to limit the side swing of the housing to a predetermined arc.

Let us assume that the improved hose valve is threaded onto the extremity of the supply hose 10; that the receiving hose 11 (or a set nozzle) is threaded onto the external threads 15; and that the point 25 is inserted into the ground as shown in Fig. 3. Now if the hose 10 is drawn straight as shown in solid line in Fig. 3 the crank member will be in the position of Fig. 2 with the valve disc 19 seated on and sealing the valve seat 18 so that no water can flow to the receiving hose 11 on the lawn sprinkler.

Now let us assume that the supply hose is swung to one side as indicated in broken line in Fig. 3. This swings the valve housing 12 to one side while the valve rod 22 is prevented from rotating by the lever 23 and the point 25. The result is to cause the valve stem 20 to act against the crank member 21 so as to tilt the valve disc from its seat to allow water to flow through the hose valve to the receiving hose or sprinkler. Thus, it can be seen that the valve can be actuated to and from the closed position by simply swinging the supply hose 10 back and forth.

The crank member and the crank rod may have any desired construction. As illustrated, the crank rod is a simple straight rod provided with a cap or head 27 at its upper extremity and with a sharp ground-engaging point 28 at its lower extremity. The crank member is carried in a crank fitting 29 through which the rod 22 passes and which is locked to the rod by means of a suitable set screw 30. The forward extremity of the valve stem 20 is bifurcated so as to pass on both sides of the crank member 21 so that angular movement of the housing 12 in either direction will tilt the valve disc 19 to the open position. The point 28 on the rod 22 serves as an additional anchor for the valve rod to prevent rotation of the latter when the housing is swung from side to side.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A hose valve comprising: an elongated, tubular valve housing; internal threads formed at the intake extremity of said housing; external threads formed at the discharge extremity of said housing; a valve seat formed in said housing adjacent said internal threads; a valve disc positioned in said housing between said internal threads and said seat and adapted to seal the latter; a valve stem extending from said valve through said seat into said housing; a crank rod extending diametrically through said housing; a crank member carried by said rod positioned adjacent said valve stem and adapted, when said housing is rotated relative to said rod, to contact said valve stem to tilt said valve from its seat; a locking lever secured to said rod exteriorly of said housing; and means for stationarily anchoring said lever in the ground.

2. A hose valve as described in claim 1 having a supporting foot member secured to said housing and projecting outwardly from each side thereof and acting to support said housing in a horizontal position.

3. A hose valve as described in claim 2 in which the supporting foot is turned downwardly at its extremities to act as a stop to limit the angular movement of said housing about the axis of said rod.

4. A hose valve comprising: an elongated, tubular valve housing; internal threads formed at the intake extremity of said housing; external threads formed at the discharge extremity of said housing; a valve seat formed in said housing adjacent said internal threads; a valve disc positioned in said housing between said internal threads and said seat and adapted to seal the latter; a valve stem extending from said valve through said seat into said housing; a crank rod extending diametrically through said housing and projecting downwardly therefrom; a crank member on said rod within said housing positioned when rotated to contact said stem to tilt said valve from its seat; a first ground-engaging point formed on the lower extremity of said rod; a locking lever secured to said rod below said housing; and a second ground-engaging point formed on said lever, said two ground-engaging points acting to prevent rotation of said rod as said housing is swung from side to side about the axis of said rod to cause said stem to contact the stationary crank member and tilt said valve from its seat.

References Cited in the file of this patent

UNITED STATES PATENTS

| | | |
|---|---|---|
| 819,944 | Stevenson | May 8, 1906 |
| 1,031,176 | Gilpin | July 2, 1912 |
| 2,151,278 | Milhaupt | Mar. 21, 1939 |
| 2,245,097 | Tobler | June 10, 1941 |